(12) United States Patent
Hüser et al.

(10) Patent No.: US 9,328,787 B2
(45) Date of Patent: May 3, 2016

(54) RUBBER STOPPER

(71) Applicant: HELLA KGAA HUECK & CO, Lippstadt (DE)

(72) Inventors: Theodor Hüser, Geseke (DE); Udo Schubert, Paderborn (DE)

(73) Assignee: HELLA KGAA HUECK & CO (DE)

( * ) Notice: Subject to any disclaimer, the term of this patent is extended or adjusted under 35 U.S.C. 154(b) by 72 days.

(21) Appl. No.: 13/662,084

(22) Filed: Oct. 26, 2012

(65) Prior Publication Data

US 2013/0187319 A1    Jul. 25, 2013

(30) Foreign Application Priority Data

Oct. 26, 2011   (DE) .......................... 10 2011 054 817

(51) Int. Cl.
*F16F 1/373*    (2006.01)
*F16F 3/087*    (2006.01)

(52) U.S. Cl.
CPC .............. *F16F 1/373* (2013.01); *F16F 1/3735* (2013.01); *F16F 3/087* (2013.01)

(58) Field of Classification Search
CPC ........... F16F 1/50; F16F 1/373; F16F 1/3732; F16F 1/40; F16F 1/403; F16F 1/38; F16F 1/406; F16F 1/445; F16F 1/54; F16F 2236/103; F16F 7/00; F16F 3/093; F16F 3/0873

USPC ............ 267/141, 141.1, 141.2, 141.4, 141.5, 267/141.6, 140, 140.11, 293, 141.7; 361/679; 296/96.15, 96.17; 248/609, 248/615, 560
See application file for complete search history.

(56) References Cited

U.S. PATENT DOCUMENTS

| | | | | | |
|---|---|---|---|---|---|
| 3,534,936 | A | * | 10/1970 | Knowlton | F16B 21/02 248/653 |
| 5,295,652 | A | * | 3/1994 | Byrne | B60G 21/0551 16/2.1 |
| 5,609,329 | A | * | 3/1997 | Scholl | B60S 1/0444 267/141 |
| 6,198,715 | B1 | * | 3/2001 | Kouno | F16F 15/363 720/693 |
| 2004/0168464 | A1 | * | 9/2004 | Seo | F16F 1/3732 62/295 |
| 2005/0073166 | A1 | * | 4/2005 | Snyder | B62D 24/02 296/35.1 |
| 2006/0255516 | A1 | * | 11/2006 | Dickson | F16F 15/08 267/141.1 |

* cited by examiner

*Primary Examiner* — Robert A Siconolfi
*Assistant Examiner* — San Aung
(74) *Attorney, Agent, or Firm* — Husch Blackwell LLP

(57) ABSTRACT

A damper for damping vibrations between a support and a device mounted on the same includes two elastic elements which can be attached to the support by means of a bolt and a securement means. The damper should be suitable for different material thicknesses of the support. This is achieved in that a step is constructed on an outer periphery of a first element, wherein a smaller cross-section formed by the step corresponds to the cross-section of an opening in the support which is functionally assigned thereto, and the part having the smaller cross-section is longer than a thickness of the support, and in that a bore hole is included in an end face of a second element, wherein the cross-section of the bore hole corresponds to that of the opening.

5 Claims, 2 Drawing Sheets

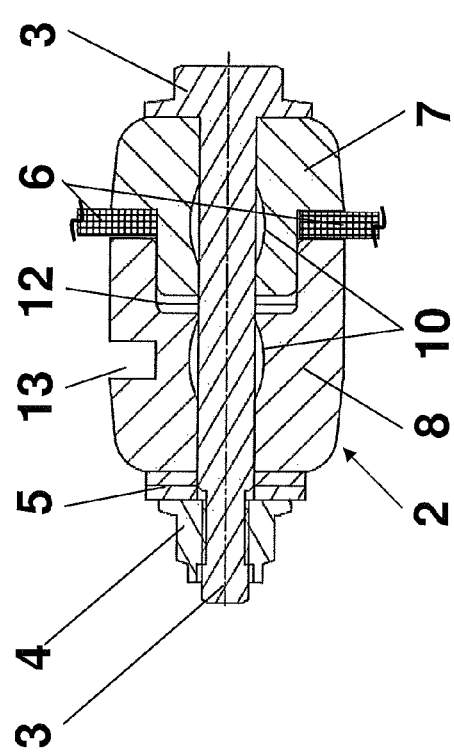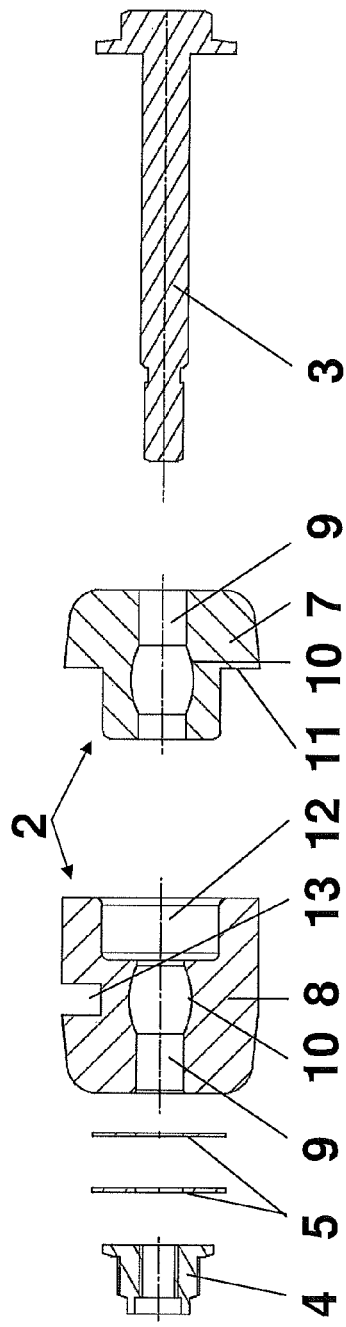
Fig. 2
Fig. 3

RUBBER STOPPER

CROSS REFERENCE

This application claims priority to German Patent Application No. 10 2011 054 817.3, filed Oct. 26, 2011, which is expressly incorporated in its entirety by reference herein.

TECHNICAL FIELD OF THE INVENTION

The invention relates to a damper for damping vibrations between a support and a device mounted thereon, having two elastic elements which can be attached on the support by means of a bolt and a securement means.

BACKGROUND OF THE INVENTION

Prior art dampers are used for the purpose of attaching devices to a support in cases where a transmission of vibrations should be prevented or at least reduced. Such a transmission takes place when, by way of example, metal is directly attached to metal. In order to dampen the transmission of vibration, an indirect connection is used, wherein at least one elastic element is inserted between the parts— meaning between the support and the device—such that the parts do not directly touch. In this case, the elastic element must be neither too loose, in order to prevent increased wear, nor too strongly tensioned, in order to optimize the dampening.

The use of elastic annular disks as such dampers, for example, is known, wherein said annular disks are held between two hard annular disks. The hard annular disks are rigidly connected by means of a centric sleeve. A groove is included in an outer periphery of the elastic annular disk, and a corresponding holding part of a device can be clamped into said groove. In addition, the use of elastic annular disks without the hard annular disks, and without the sleeve, is known, and disclosed in DE 41 09 548 C3, for example. Two to four dampers, along with the device, are attached to a support, for example by means of bolts and nuts.

In addition, dampers are known which have two elastic elements with a circular cross-section. A step is constructed on an outer periphery of one of the first elements in such a manner that a smaller cross-section corresponds to the cross-section of an opening of a support, wherein said opening is functionally assigned to said smaller cross-section, wherein a length of the smaller cross-section corresponds exactly to a thickness of the support. A groove is included in a partial periphery of one of the second elements in order to clamp a device being attached thereto.

The known dampers have the disadvantage that they can only be used for one particular thickness of the support.

SUMMARY OF THE INVENTION

For this reason, the problem addressed by the invention is that of creating a damper which can be used for different support thicknesses.

A step is constructed in an outer periphery of one of the first elements, wherein a smaller cross-section formed by the step corresponds to an opening in the support which is functionally assigned thereto, and the part having the smaller cross-section is longer than a thickness of the support. The step abuts a side of the support, while the part of the first elastic element having the smaller cross-section projects from the other side of the support. In this way it is ensured that the first element penetrates through the opening in the support regardless of the thickness thereof; a shaft of a fastening means, for example a bolt, cannot touch the support—thereby reliably preventing a transmission of vibrations, particularly of sound.

A bore hole is included in an end face of one of the second elements, wherein the cross-section thereof corresponds to that of the opening. The part of the first element which projects from the support is accommodated in this opening. As a result, the elements can be reliably pretensioned against the support, on the one hand; as such, the damper as a whole is held securely and sufficiently static on the support. On the other hand, an unallowable deformation of the second element, and therefore a disruption of the pretensioning, is prevented during the pretensioning, because the bore hole is at least partially filled in.

As such, the damper has a size which can be universally used for different support thicknesses.

In one embodiment, a groove is included in a partial periphery of the second element. In this way, it is possible to clamp a device to the damper in a simple manner, and therefore attach the same directly to the support.

In a further embodiment, bore holes of the elements have notches. This results in a further reduction of the transmission of structure-borne sound.

In a further embodiment, the damper is made of rubber. As an alternative, the damper is made of elastic plastic. These materials are robust and are available in the required hardness.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 2 shows a detailed longitudinal section of a damper with bolts and securement means, and FIG. 3 shows an exploded view of the damper in FIG. 2.

DETAILED DESCRIPTION

Figure 1:
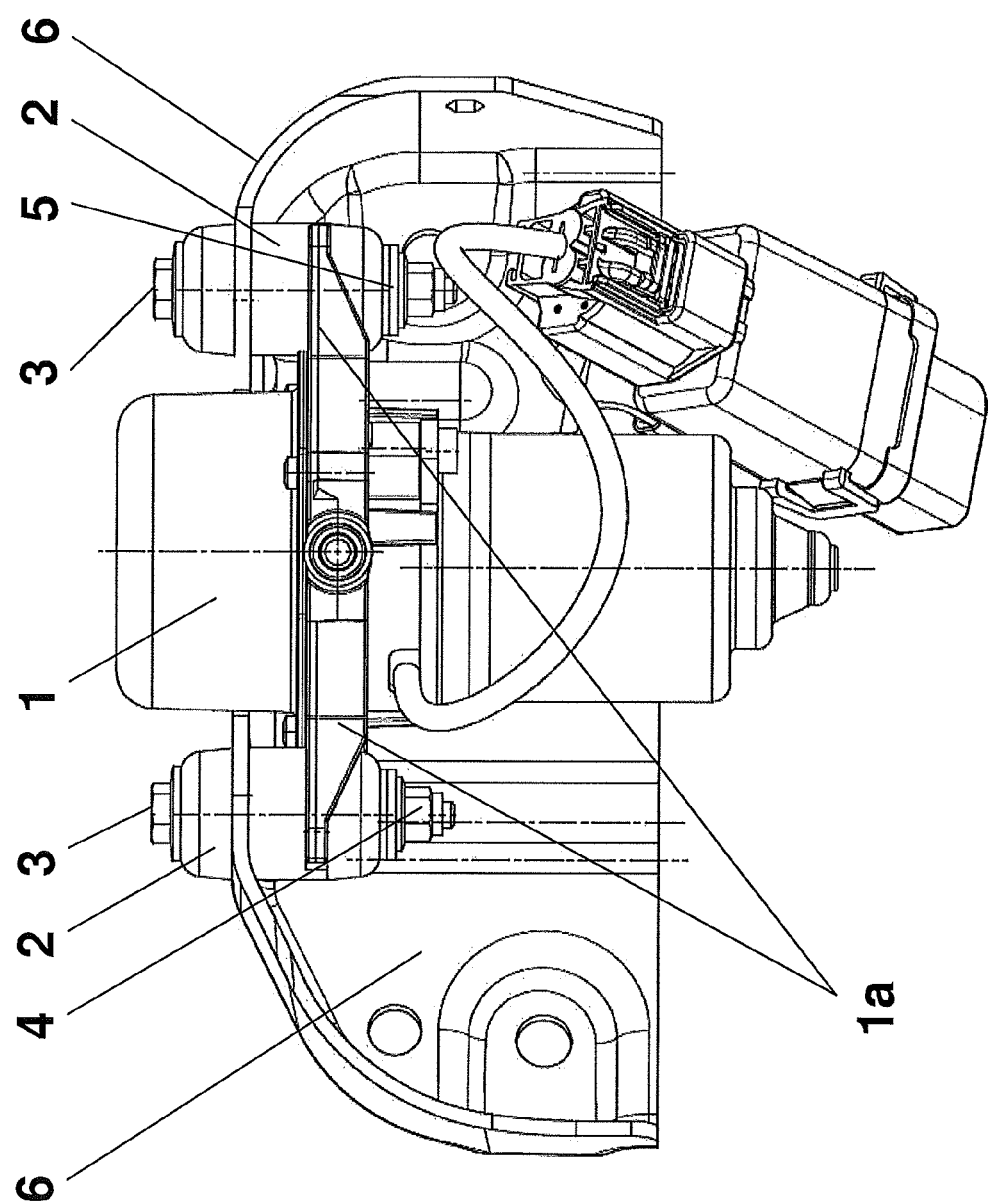
FIG. 1 shows a holder having a device attached thereto.

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

As can be seen in FIG. 1, a device 1, which in this case is a vacuum pump, is directly mounted via two dampers 2 on a support 6, by means of two bolts 3. For this purpose, corresponding openings are arranged in the support 6. Each bolt 3 is secured by a securement means 4 against displacement, wherein at least one shim disk and/or spacer disk 5 is arranged between the securement means 4 and the damper 2. The device 1 has a flange 1*a* which extends radially with respect to a longitudinal axis of the device 1, and is attached to the housing thereof. The flange 1*a* has two recesses on its periphery which lie opposite each other radially. One of the dampers 2 is clamped into each of the recesses, such that the device 1 is mounted on the support 6.

The damper 2 is illustrated in detail in FIGS. 2 and 3. It has a cross-section which is substantially circular, wherein its general diameter is significantly larger than that of the opening of the support 6. The damper 2 has a first element 7 and a second element 8, of which one is attached on the upper side of the support 6, and the other is attached on the underside of the same, when assembled. Bore holes 9 with circular cross-sections are included in the center of the elements 7, 8, parallel to their longitudinal axes. These bore holes 9 have notches 10, meaning radial notches, which extend over the periphery of the bore holes 9 and which have the shape of a circular arc in the longitudinal section in FIG. 2.

The first element 7 has a step 11 on its outer periphery which is arranged approximately at half of the length of the first element 7. The diameter of the first element 7 narrows at the step 11 to approximately two-thirds of the general diameter of the damper 2, wherein the narrowed diameter corresponds to the diameter of the opening of the support 6.

The second element 8 has a bore hole 12 on the end face thereof which is functionally assigned to the first element 7, and the diameter of the bore hole [12] corresponds exactly to that of the opening, and therefore to the narrowed diameter of the first element 7. A depth of the bore hole 12 is the same as the length of the part of the first element 7 having the narrowed diameter, in addition to an only slightly significant thickness of the support 6. A groove 13 is included in a partial periphery of the second element 8. The groove 13 is approximately centered with respect to the longitudinal dimension of the second element 8, such that a sufficient distance from the bore hole 12 is preserved.

The damper 2 is made of rubber or elastic plastic.

The bolt 3 has no play, or minimal play, with respect to the bore hole 9, and is a headed screw, for example, wherein the securement means 4 is a nut, for example; these and the spacer disk(s) 5 are made of metal or hard plastic.

As an alternative, the bolts 3 and the securement means 4 can interlock with each other.

For the purpose of attaching the device 1, one of the second elements 8 is inserted into each recess of the flange 1a in such a manner that the flange 1a engages with the groove 13 on the flanks of each recess. The two first elements 7 with the bolts 3 pressed into the bore holes 9 are pressed into the openings of the support 6 in such a manner that the steps 11 abut the primary surface (side) of the support 6 functionally assigned to them, and a part of the first elements 7 having the narrowed diameter projects on the opposite side. The device 1, along with the dampers 2, is brought to the support 6, wherein the bolts 3 are pressed into the bore holes 9 of the second elements 8, and the projecting parts of the first elements 7 are pressed into the bore holes 12. The shim disk and/or the spacer disk(s) 5, along with the securement means 4, are attached on the free end of each bolt 3. In this case, a predetermined, permanent pretensioning is applied to the dampers 2. In this way, a play which is potentially present is removed from the attachment overall, such that wear is kept at a minimum and a high damping performance is achieved. The predetermined pretensioning is achieved by selecting the thickness of the spacer disk(s) 5 according to the thickness of the support 6.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE NUMBERS 1 device
1a flange
2 damper
2 bolt
4 securement means
5 spacer disk
6 support
7 first element
8 second element
9 bore holes
10 notch
11 step
12 bore hole
13 groove

The invention claimed is:

1. A damper for damping vibrations between a support and a device mounted on the same, comprises:
   first and second discrete elastic elements configured for attachment to the support,
   wherein said first element further comprises a step in an outer periphery of the first element, wherein a smaller cross-section formed by the step corresponds to a cross-section of an opening in the support and is longer than a thickness of the support, and
   wherein said second element further comprises a first bore hole in an end face of the second element, and has a cross-section which corresponds to that of the opening in the support, the second element including a groove in a partial periphery thereof, wherein said partial periphery is less than an entire periphery thereof.

2. The damper according to claim 1, wherein each of said first and second elements is provided with a bore hole, each bore hole further provided with a notch.

3. The damper according to claim 1, wherein said damper is made of rubber.

4. The damper according to claim 1, wherein said damper is made of elastic plastic.

5. The damper according to claim 2, wherein one of said notches is adjacent to said groove, and the other of said notches is adjacent to the opening in the support.

* * * * *